March 10, 1953     O. LUTHERER     2,630,832
SAFETY SHUTOFF VALVE

Filed Oct. 13, 1948     2 SHEETS—SHEET 1

*INVENTOR.*
OTTO LUTHERER
BY
*Hyde, Meyer, Baldwin & Doran*
ATTORNEYS

March 10, 1953
O. LUTHERER
2,630,832
SAFETY SHUTOFF VALVE
Filed Oct. 13, 1948
2 SHEETS—SHEET 2
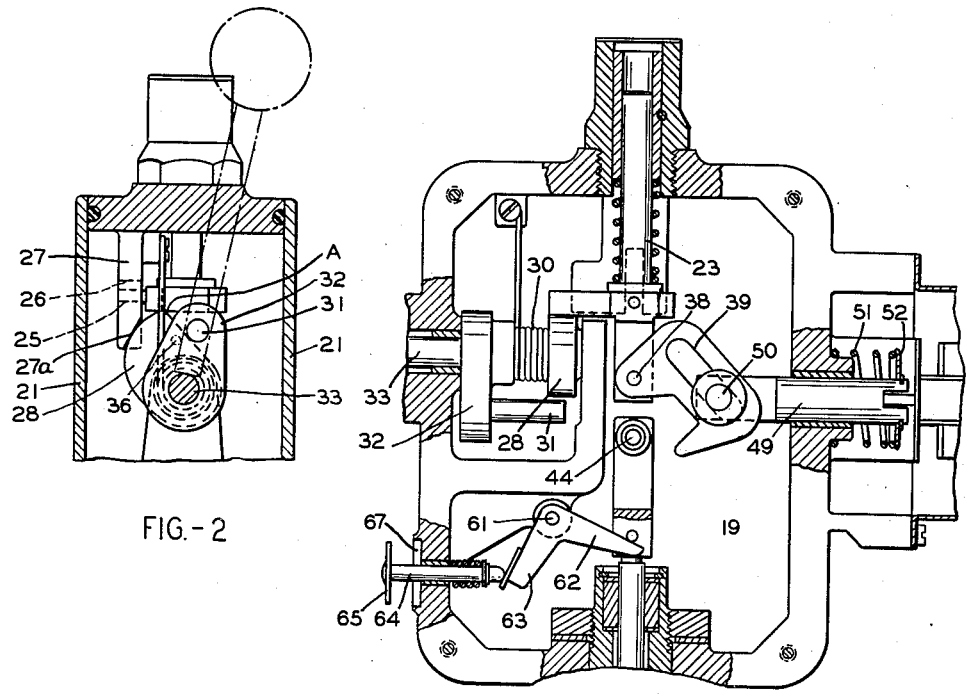
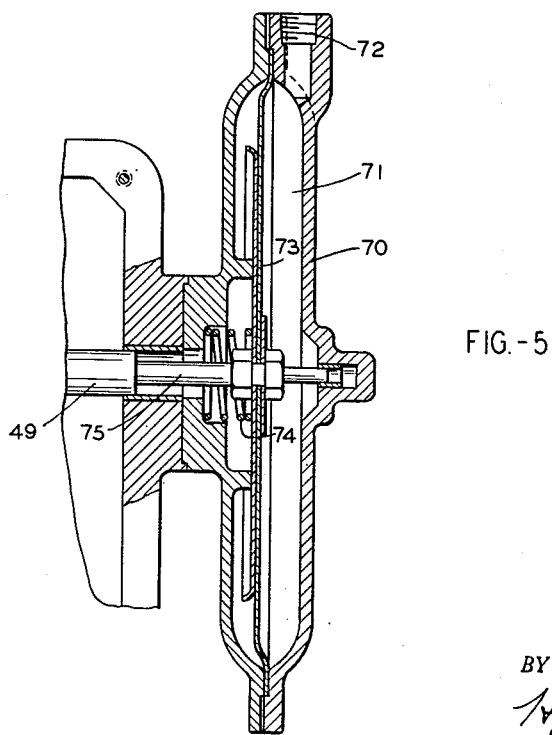
*INVENTOR.*
OTTO LUTHERER
BY
Hyde, Meyer, Baldwin & Doran
ATTORNEYS

UNITED STATES PATENT OFFICE 2,630,832

SAFETY SHUTOFF VALVE

Otto Lutherer, Chagrin Falls, Ohio, assignor to The North American Manufacturing Co., Cleveland, Ohio, a corporation of Ohio Application October 13, 1948, Serial No. 54,327

7 Claims. (Cl. 137—695)

This invention relates to safety shut-off valves such as are used for controlling the flow of fluids, and more particularly gaseous or liquid fuels, or a mixture thereof with air.

One object of the invention is to provide an improved safety shut-off capable of manual operation, at will, to open or close the valve, but which is also controlled automatically, or by power, in the sense that the valve control and operating parts include improved means for preventing valve opening operation at any time when power flow is cut off or interrupted or is not operative or effective in the power system served by the valve, and in which it is also impossible to manually open the valve and then hold it open at any time when there is no power flow.

A further object of the invention is to provide simple and improved valve operating and control mechanism for the purpose stated, capable of manufacture and sale as a unit and adapted for connection to standard valve devices such as are available on the open market.

Another object is to provide improved safety shut-off valve mechanism including a manually operatable valve, and operating mechanism therefor including a part movable to a releasable maintaining position and a disconnectible couple, together with power controlled means for adjusting the couple members to coupled or uncoupled relation according to whether the power system is effective or not.

Further objects of the invention in part are obvious and in part will appear more in detail hereinafter.

In the drawings, which represent one suitable embodiment of the invention, Fig. 1 is a side elevation with a cover plate omitted to expose interior parts, and illustrating the valve device somewhat conventionally;

Fig. 2 is a detail sectional elevation on substantially the line 2—2, Fig. 1;

Fig. 4 is a view, corresponding to Fig. 1, and illustrating another position of some of the parts, and Fig. 5 is a detail sectional view illustrating a modified control system.

Figure 1:
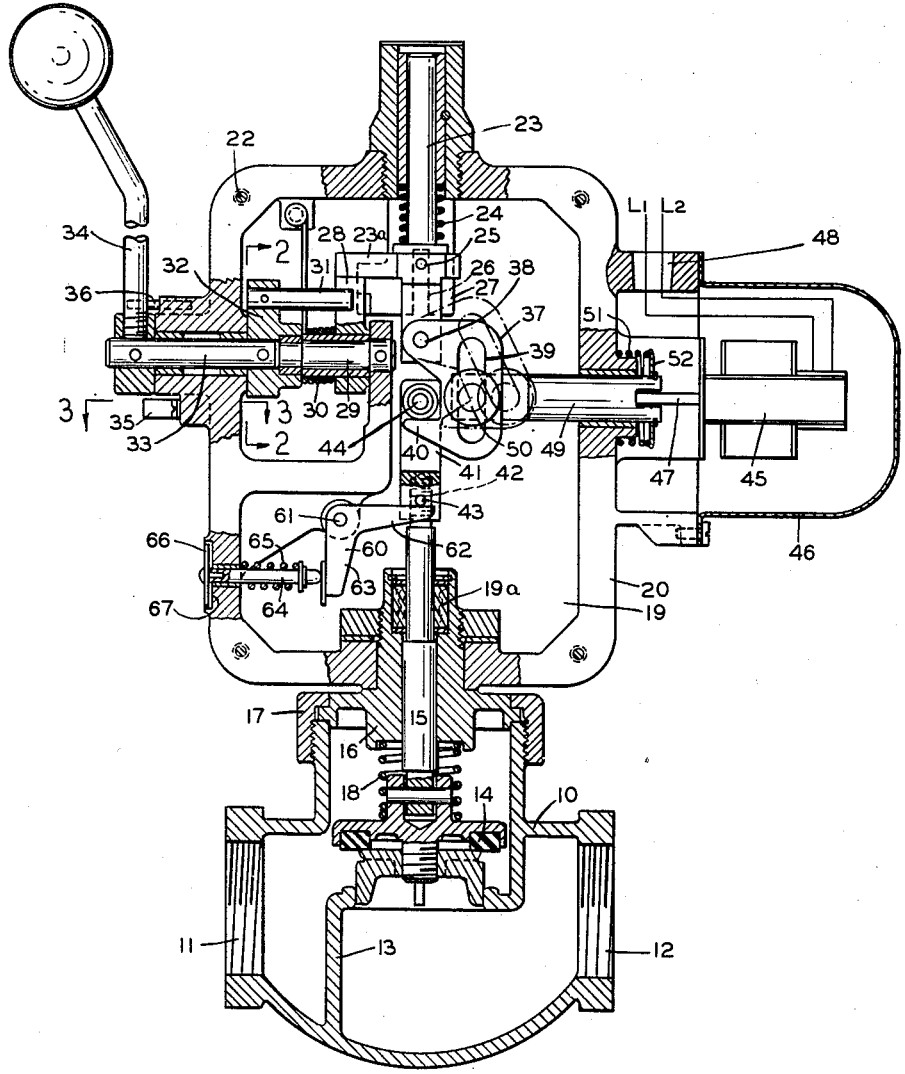

The valve operating and control mechanism shown for purposes of illustration in the drawings is adapted for manufacture and sale as a unit and for attachment to the body parts of standard valve devices. In other words, the present control mechanism may be used as a substitute for the bonnet, valve, valve stem and attached parts of any standard valve, and is so shown.

As illustrated, 10 indicates the body or casing of a standard valve device having supply and discharge openings 11, 12, communicating through a cross wall 13, the port or opening in which is controlled by valve member 14 mounted at the lower end of a stem 15 slidable in a cap or bonnet member 16 which may be held in place upon the valve body by the usual securing nut 17. A strong compression spring 18 within the valve chamber normally biases the valve and its stem toward closed position.

Above the bonnet member 16 the valve stem extends into the chamber 19 of the sealed casing of the present control mechanism, leakage from the valve chamber to the casing chamber 19 being prevented by one or more packings around the valve stem, such as indicated at 19a.

The casing includes a body member 20, of generally rectangular form provided with right and left cover plates 21 secured to the body at intervals by securing screws or bolts 22.

Slidably mounted in the upper portion of the chamber 19 is an operating stem 23, connected to the valve, as will later appear, and biased downwardly by a strong compression spring 24 and held against rotation in any suitable manner, such as by a lateral pin 25 slidable vertically in a slot or recess 26 in a casing post 27. Stem 23 has securely attached thereto a lifting collar or abutment member 23a, a portion of which lies above a cam 28 rotatable upon a pin or shaft 29 mounted in the casing. Cam 28 is biased to turn upon said pin in the clockwise direction, Fig. 2, by a torsion spring 30, its motion in that direction being limited by an operating pin 31 carried by an arm 32 supported on the inner end of a shaft 33 which extends outwardly, through a suitable bearing in the casing wall, to the outside of chamber 19, the outer end of said shaft being provided with an operating arm 34.

Figure 3:
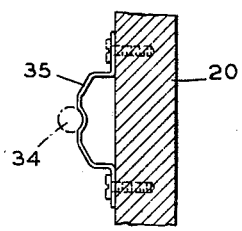
Fig. 3 is a detail sectional plan view on the line 3—3, Fig. 1.

In its normal position, with the valve closed, this arm 34 extends directly downwardly from the shaft 33, in which position it is releasably held by a fixed spring bail or strap 35, Fig. 3. In such position of arm 34, cam 28 occupies the position shown in full lines, Fig. 4, and the tension of bail 35 is strong enough to so hold the parts, against the effect of spring 30. When the handle is grasped and turned counterclockwise, Fig. 2, spring 35 yields and permits shaft 33 to be turned until cam 28 engages stop 27a on post 27, as shown in Fig. 2. During such motion pin 31, engaging cam 28, rotates the same from the position shown in Fig. 4 to the position shown in Fig. 2. The effect is to elevate the collar or abutment 23a and lift operating stem 23.

Motion of cam 28 is limited by its engagement with the stop shoulder 27a to a position in which its highest point, marked A, Fig. 2, is a little beyond (to the left in Fig. 2) the axis of shaft 33. In other words, it is beyond dead center. As will later appear more fully, when the cam reaches this position, with the valve open, the spring forces effective upon the cam are sufficient to bias it toward and maintain it releasably against stop shoulder 27a, so that the cam forms a firm prop, releasably supporting the valve in open position, and yet permitting manual return of handle 34 to its original position, extending downwardly from shaft 33.

Thus the parts so far described include valve operating mechanism actuated by handle 34 and including a part movable to and releasably maintained in a position beyond dead center, for releasably maintaining the valve open. The same mechanism also includes a disconnectible connection or couple, the members of which are adjustable either to coupled or uncoupled relation and are sensitive or subject to an operator actuated or controlled by the flow or presence of power in a power system, the parts being so arranged that coupled relation is or may be established or maintained by said operator only when power flows or is effective in said system, all for safety purposes, as will appear. Such parts will now be described.

The connection between stems 23 and 15 is a tension connection, in the sense that through said connection upward lift applied to stem 23 exerts an upward pull (not push) on stem 15.

Stem 23, at its lower end, is slotted to support a hook member 37 which swings on pivotal axis 38 and is provided with a vertical slot 39 and a supporting foot 40. This foot is adapted to enter or retire from the recess or opening in an eye, loop or clevis 41 attached to the upper end of the valve stem 15, as by threads 42 and pin 43. When the hook foot is within the recess of the clevis it lies below a cross pin 44 of the clevis and thus directly couples or connects stem 23 to valve stem 15, so that the two can be moved together or as a unit.

Thus, by manually lifting the arm 34, when the valve is closed, the effect is to turn shaft 33, rotate cam 28 upon its shaft 29, lift abutment 23a and stem 23, and through hook 37 and clevis 41, pull up the valve stem 15 and open the valve.

Such valve operation is possible, however, only when the hook is in coupled or connecting relation with the clevis, as shown in full lines, Fig. 1. To automatically control said hook and the disconnectible connection between handle 34 and the valve device, I provide automatically operated controlling means sensitive to the flow or cessation of flow of power in a controlling power system. By "power system," I refer to any system, operated by any kind of power, for example, electricity or the flow of fluid pressure, and used for or in connection with any apparatus with which the present shut-off valve is associated.

For example, when the power system is electrical, it may supply current to any suitable form of apparatus for controlling the pressure in a boiler to which the present shut-off valve supplies fuel, the arrangement being such that upon abnormal rise of pressure, current flow is cut off in that part of the circuit connected to the present control valve. Similarly, electric current may operate the motor for driving a fan in the blower of a furnace to which the present shut-off valve supplies gas. In this case, as well as in the first case described, upon flow of current in the electrical system, a condition may arise in which further flow of fuel is undesirable and the shut-off valve should be promptly closed.

Likewise, any boiler or other device, to which fuel is supplied by the present shut-off valve associated with the fluid pressure control, may have a conduit which may be led to the present shut-off valve for making its operation consequent upon the flow, or cessation of flow of fluid pressure in the fluid pressure controlled system.

Both arrangements will now be described.

The electrical control system illustrated in Figs. 1 to 4 inclusive includes a solenoid or electromagnet operator 45 mounted in the chamber of a subcasing 46 attached to the main casing, said solenoid or electromagnet having the usual movable armature or core provided with a stem 47 movable endwise, or to left or right, in Fig. 1. Stem 47 may be biased to the right in Fig. 1 by any suitable means such as spring 51. Current may be supplied to the operator 45 by circuit wires L1, L2 passing through an opening 48 in the casing wall and connected to any circuit or apparatus (not shown) associated or connected with the boiler or other equipment supplied by the valve and so arranged or designed that gas flow through the valve is desired only when the operator is energized. When the operator is energized, its core and the stem 47 are moved to the left, to the position shown in full lines Fig. 1, thus advancing a rod 49 slidably mounted in an opening in the main casing wall and provided on its inner end with a pin 50 passing through and working in the slot 39 of hook 37, to similarly advance said hook to its coupling position. Pin 49, hook 37, and the magnet armature associated therewith are biased to the right in Fig. 1 by a compression spring 51 pressing against a collar 52 on the outer end of the pin.

It is at once apparent that if at any particular time flow of electric power to the coil of solenoid 45 is interrupted, even momentarily, such as upon abnormal rise of pressure in the boiler, or failure of current supply to its control system, the solenoid is deenergized and pin 49 moves to the right, thus retracting the hook 37 to its dotted line position, Fig. 1, in which its foot portion 40 is out of registration or engagement with the pin 44. Thus, if the valve was open, it is released from the stem 23 by the retraction of hook 37 and immediately closes under the effect of the strong biasing spring 18. Release of the pressure of that spring upon stem 23 releases the pressure of the abutment 23a upon cam 28. That permits rotation of said cam by the torsion spring 30 back over dead center and consequent return of said cam and lever 34 to its original valve closed position. Likewise, spring 24 moves the stem 23 and its attached parts downwardly. Of course, lever 34 may be returned manually to its original position before automatic release occurs.

With the solenoid deenergized it is impossible to open the valve, because while the handle 34 can be raised to valve open position, the hook 37 is retracted and the coupling or connection between stems 23 and 15 has been opened or broken and the valve remains closed.

However, if, with the handle 34 in valve closed position, the solenoid is or becomes energized, hook 37 is advanced, against the bias of spring 51, to its full line position by said solenoid, reenters the opening in clevis 41, and establishes coupled relation or connection between stems 23 and 15, so that operation of the valve handle opens the valve in the manner before described.

If, while the valve is open, the solenoid is deenergized, biasing spring 51 immediately becomes effective to move pin 49 to the right and swing over the hook 37 so as to release the valve and permit it to return to closed position.

Assuming that the valve has been opened and that handle 34 has been returned to its normal depending position, and that the solenoid remains energized, it is apparent that cam 28 remains or is held in its valve open position as the result of its over dead center position and the strong tendency of spring 18 to hold it there. Pin 31 therefore has moved away from the cam lobe, clockwise in Fig. 2. If, now, it is desired to manually close the valve, handle 34 may be moved clockwise in Fig. 2 until it engages the opposite face or edge of the cam lobe and forcibly turns it enough to move it back across dead center, whereupon said cam, stems 23 and 15 and the valve all return to their original valve closed positions. Such operating movement of handle 34 is limited by pin 36, which is always effective to prevent full 360 degree swing of handle 34, such as might get it out of step with the cam, as it were, or possibly might injure spring 30.

Fig. 5 illustrates a fluid pressure control system, such as before described, used in connection with the boiler or other device served by the present shut-off valve. This fluid pressure system includes a casing 70 provided with an inner chamber 71 to which pressure is supplied through the connection 72. In said chamber is a movable abutment, such as diaphragm 73 biased to the right by any suitable device, such as compression spring 74, and connected to a stem 75 projecting out from the casing. This stem corresponds to the stem 47 of the electromagnet 45 in Fig. 1 and will be understood to cooperate with stem 49 and hook 37 in the same manner before described.

In other words, with this arrangement, when the boiler or other device served by the valve is operating properly, fluid pressure will be present and effective in the fluid pressure control system so that diaphragm 73 will be sensitive to such pressure and lie in the position shown in Fig. 5, or in its extreme left-hand position. Thus, it will hold the hook 37 in such position as to effectively couple the rods 23, 15.

Upon failure of pressure in the power system all parts move to the right, including the stem 75 and the coupling hook, releasing the parts so that the valve closes as before. Coupled relation is reestablished when fluid pressure flow is resumed.

Fig. 1 also illustrates an arrangement for constantly keeping the operator informed of the true position of the valve, notwithstanding that the casing is closed and all working parts are concealed. The means shown for the purpose comprises a bell crank lever 60 pivoted at 61, one arm 62 of which engages the pin 43 on stem 15 and the other arm 63 of which engages the inner end of a pin 64 slidable in the casing and biased inwardly by a spring 65 and provided on its outer end with a head 66. When the valve is closed, pin 64 is projected outwardly and the head 66 lies outwardly beyond the surface of the casing wall, as in Fig. 4, while when said valve is open, as shown in Fig. 1, pin 64 is moved to the right and the head 66 is buried in a counter-recess 67 of the wall, to which it is fitted. Other arrangements for the same purpose will be obvious to those skilled in the art.

The mechanism described is sturdy and of relative simple construction and enables a valve to be opened and closed manually at will, but nevertheless, subject to power flow control in such manner that when open it will close upon interruption of the flow and when closed it cannot be opened or held open unless power is flowing or being applied. The valve itself is biased toward closed position, and its operating mechanism includes a part actuated manually to move it over dead center to a maintaining position against a stop where it is releasably held by a biasing force. The same mechanism includes a disconnectible coupling or connection actuated by yielding means biasing it one way and power controlled means for operating it another way, for either uncoupling or coupling the connection. Thus the valve is sensitive both to manual operation and power control. Hook member 37 also is suspended in such manner that it may be operated with a minimum of power, so that the mechanism is extremely sensitive in operation.

Other advantages of the invention will be apparent to those skilled in the art.

What I claim is:

1. Safety shut-off valve mechanism, comprising a casing for said mechanism, a valve member movable back and forth between closed and open positions, manually operatable means movable relative to said casing for opening the valve, a stop means, operating connections between said means and the valve, including a part pivotal about an axis fixed with respect to said casing, said part being pivotal across dead center to a maintaining position against said stop means from which it is releasable, and means biasing said part in either direction away from dead center and urging said valve toward closing position when biasing said part in one of said directions.

2. Safety shut-off valve mechanism, comprising a reciprocable valve member having a stem, a rod in endwise alinement with the valve stem and provided with an abutment shoulder, a disconnectible coupling between said stem and rod, power means for connecting said coupling to position said mechanism for opening said valve and for disconnecting said coupling for causing closing of said valve, manually operatable means effective upon said shoulder for causing opening and closing of the valve when the coupling is connected, said manually operatable means including an overcenter cam cooperating with said shoulder, and means independent of said manually operatable means for maintaining said cam releasably in valve open position.

3. Safety shut-off valve mechanism, comprising a valve member movable back and forth between closed and open positions, means biasing said valve toward closed position, manually operatable means for advancing said member to valve open position, said means including a cam rotatably mounted on a pivot, said cam having a high point, a rod mounted for endwise reciprocation between valve-open and valve-closed positions, means urging said rod toward valve-closed position, an abutment on said rod engageable by said cam, said manually operatable means operatively engaging said cam to move said high point thereof beyond dead center, where the force of said urging means is in line with said high point and said pivot, to a position for maintaining said valve open, a coupling between said rod and said valve member having coupled and uncoupled positions, means biasing said coupling into one of its positions, and power operated means operatively connected to said coupling and energizable to actuate said coupling into the other of its positions, whereby when the valve is open a change in the energization of the power operated means releases said valve for closing.

4. The combination of claim 3 including spring means operatively connected with said cam to move the latter back across said dead center to release said valve for closing, and said urging means and said biasing means preponderating over said spring means when the high point of said cam is beyond dead center.

5. The combination of claim 3 including a second operative engagement between said manually operatable means and said cam for manually moving the latter back across dead center to release said valve for closing.

6. Safety shut-off valve mechanism, comprising a valve member movable back and forth between closed and open positions and biased towards closed position, manually operable means for advancing said member between said valve open position and said valve closed position, said means including a cam rotatably mounted on a pivot and having a high point engageable with said valve member to cause opening and closing of said valve, a stop means and a manually operable member operatively engaging in a first position said cam to move said cam in one direction to carry said high point thereof beyond dead center to a position for maintaining said valve open against said stop means by the force biasing said valve toward closed position, said manually operable member being movable relative to said cam into a second operative engagement position with said cam for manually moving the latter in the opposite direction back across dead center to release said valve for movement to its normal closed position.

7. The combination of claim 6 including a coupling between said valve member and said manually operable means having coupled and uncoupled positions, means biasing said coupling into one of its positions, and power operated means operatively connected to said coupling and energizable to actuate said coupling into the other of its positions, whereby when the valve is open a change in the energization of the power actuated means releases said coupling so that said valve is closed by its bias.

OTTO LUTHERER.

REFERENCES CITED

The following references are of record in the file of this patent:

UNITED STATES PATENTS

| Number | Name | Date |
| --- | --- | --- |
| 2,039,933 | Rupert | May 5, 1933 |
| 2,258,811 | Ray | Oct. 14, 1941 |
| 2,301,876 | Hurlburt | Nov. 10, 1942 |
| 2,305,438 | Michaels | Dec. 15, 1942 |
| 2,396,815 | Blum | Mar. 19, 1946 |